(12) United States Patent
Pan et al.

(10) Patent No.: US 12,075,400 B2
(45) Date of Patent: *Aug. 27, 2024

(54) DOWNLINK TRANSMISSION POWER CONTROL ON BWP

(71) Applicant: VIVO MOBILE COMMUNICATION CO., LTD., Chang'an Dongguan (CN)

(72) Inventors: Xueming Pan, Chang'an Dongguan (CN); Yumin Wu, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/337,369

(22) Filed: Jun. 19, 2023

(65) Prior Publication Data

US 2023/0337210 A1 Oct. 19, 2023

Related U.S. Application Data

(63) Continuation of application No. 17/963,852, filed on Oct. 11, 2022, now Pat. No. 11,737,076, which is a (Continued)

(30) Foreign Application Priority Data

Aug. 9, 2017 (CN) .......................... 201710677047.5

(51) Int. Cl.
*H04W 4/00* (2018.01)
*H04W 52/14* (2009.01)
(Continued)

(52) U.S. Cl.
CPC ..... *H04W 72/0473* (2013.01); *H04W 52/143* (2013.01); *H04W 52/146* (2013.01);
(Continued)

(58) Field of Classification Search
None
See application file for complete search history.

(56) References Cited

U.S. PATENT DOCUMENTS 8,699,391 B2 4/2014 Yeon et al.
8,996,055 B2 3/2015 Wang et al.
(Continued)

FOREIGN PATENT DOCUMENTS

CN 102118842 A 7/2011
CN 102271389 A 12/2011
(Continued)

OTHER PUBLICATIONS

Communication pursuant to Article 94(3) received in European Application No. 18 843 237.1-1206 dated Sep. 14, 2023, 4 pages.
(Continued)

*Primary Examiner* — Bob A Phunkulh
(74) *Attorney, Agent, or Firm* — Culhane PLLC; Stephen J. Weed

(57) ABSTRACT

A method includes: receiving downlink transmission on a second target BWP in accordance with one or more target downlink power adjustment parameters among downlink power adjustment parameters configured by a network device. The one or more target downlink power adjustment parameters correspond to the second target BWP. And the downlink power adjustment parameters are configured by the network device for respective BWPs separately.

10 Claims, 9 Drawing Sheets

Related U.S. Application Data continuation of application No. 16/785,365, filed on Feb. 7, 2020, now Pat. No. 11,503,603, which is a continuation of application No. 16/637,408, filed as application No. PCT/CN2018/096813 on Jul. 24, 2018, now Pat. No. 11,622,354.

(51) Int. Cl.
  *H04W 52/24* (2009.01)
  *H04W 52/32* (2009.01)
  *H04W 52/36* (2009.01)
  *H04W 72/044* (2023.01)

(52) U.S. Cl.
  CPC ....... *H04W 52/242* (2013.01); *H04W 52/325* (2013.01); *H04W 52/365* (2013.01); *H04W 52/367* (2013.01)

(56) References Cited

U.S. PATENT DOCUMENTS

| | | | |
|---|---|---|---|
| 2008/0176575 | A1 | 7/2008 | Sutton |
| 2011/0038271 | A1 | 2/2011 | Shin et al. |
| 2012/0008552 | A1 | 1/2012 | Baldemair et al. |
| 2012/0294267 | A1 | 11/2012 | Wang et al. |
| 2012/0314603 | A1 | 12/2012 | Wen et al. |
| 2013/0021926 | A1 | 1/2013 | Geirhofer et al. |
| 2013/0065631 | A1 | 3/2013 | Lu |
| 2013/0182672 | A1 | 7/2013 | Kakishima et al. |
| 2013/0260805 | A1 | 10/2013 | Park et al. |
| 2014/0329551 | A1 | 11/2014 | Ryoo et al. |
| 2015/0304995 | A1 | 10/2015 | Yi et al. |
| 2016/0014778 | A1 | 1/2016 | Zhou et al. |
| 2016/0029239 | A1 | 1/2016 | Sadeghi et al. |
| 2016/0142984 | A1 | 5/2016 | Lee et al. |
| 2017/0019864 | A1 | 1/2017 | Hwang et al. |
| 2017/0201950 | A1 | 7/2017 | Liu |
| 2017/0273026 | A1 | 9/2017 | Fakoorian et al. |
| 2017/0289921 | A1 | 10/2017 | Kim et al. |
| 2017/0318565 | A1 | 11/2017 | Elbwart et al. |
| 2018/0128646 | A1 | 5/2018 | Meek |
| 2018/0160379 | A1 | 6/2018 | Yokomakura et al. |
| 2018/0317180 | A1 | 11/2018 | Li et al. |
| 2018/0376430 | A1 | 12/2018 | Liu |
| 2019/0239171 | A1 | 8/2019 | Ahn et al. |
| 2019/0327037 | A1 | 10/2019 | Yoshimoto et al. |
| 2020/0084733 | A1* | 3/2020 | Palenius ............ H04J 11/0069 |
| 2020/0163025 | A1 | 5/2020 | Osawa |
| 2020/0178259 | A1 | 6/2020 | Pan et al. |
| 2020/0213065 | A1* | 7/2020 | Takeda ................. H04L 5/0092 |
| 2020/0336987 | A1 | 10/2020 | Mukherjee et al. |
| 2020/0374866 | A1* | 11/2020 | Takeda ................. H04L 5/0053 |
| 2021/0282090 | A1 | 9/2021 | Zhang et al. |

FOREIGN PATENT DOCUMENTS

| | | |
|---|---|---|
| CN | 102378245 A | 3/2012 |
| CN | 102448160 A | 5/2012 |
| CN | 103168442 A | 6/2013 |
| CN | 103460634 A | 12/2013 |
| CN | 104936126 A | 9/2015 |
| CN | 108811138 A | 11/2018 |
| CN | 109392065 B | 6/2020 |
| EP | 2963970 A1 | 1/2016 |
| WO | 2008089183 A1 | 7/2008 |
| WO | 2011035558 A1 | 3/2011 |
| WO | 2012173570 A1 | 12/2012 |
| WO | 2014031998 A1 | 2/2014 |
| WO | 2014153752 A1 | 10/2014 |
| WO | 2014198067 A1 | 12/2014 |
| WO | 2015036751 A2 | 3/2015 |
| WO | 2016045130 A1 | 3/2016 |

OTHER PUBLICATIONS

Huawei et al., "General considerations on UL power control design," 3GPP TSG RAN WG1 NR Ad-Hoc Meeting, R1-1709948, Qingdao, China, Jun. 27-30, 2017, 6 pages.
Huawei et al., "On bandwidth adaptation," 3GPP TSG RAN WG1 NR Ad-Hoc Meeting, R1-1711424, Qingdao, China, Jun. 27-30, 2017, 5 pages.
Huawei et al., "Overview of NR UL for LTE-NR coexistence," 3GPP TSG RAN WG1 NR Ad-Hoc Meeting, R1-1709979, Qingdao, China, Jun. 27-30, 2017, 12 pages.
Office Action received in Chinese Application No. 201710677047.5 dated Aug. 8, 2023, with translation, 97 pages.
Samsung, "On PHR aspects for NR," 3GPP TSG RAN WG1 Meeting #89, R1-1708066, Hangzhou, China, May 15-19, 2017, 4 pages.
1st Chinese Office Action for Chinese Application No. 201710677047, dated Dec. 25, 2019 (dated Dec. 25, 2019)—8 pages (English translation—10 pages).
1st Chinese Office Action for Chinese Application No. 201710677047.5, dated Dec. 25, 2019 (Dec. 25, 2019)—8 pages (English translation—10 pages).
1st Chinese Office Action for Chinese Application No. 202010408860.4, dated May 24, 2021 (May 24, 2020)—7 pages (English translation—8 pages).
1st Chinese Office Action for Chinese Application No. 202010408860.4, dated May 24, 2021 (dated May 24, 2020)—7 pages (English translation—8 pages).
1st Non-Final Office Action for U.S. Appl. No. 16/637,408, dated Oct. 18, 2021 (dated Oct. 18, 2021)—24 pages.
2nd Chinese Office Action for Chinese Application No. 201710677047.5, dated Mar. 5, 2020 (Mar. 5, 2020)—8 pages (English translation—8 pages).
3rd Office Action for U.S. Appl. No. 16/785,365, dated Jan. 10, 2022 (Jan. 10, 2022)—16 pages.
Chinese Search Report for Chinese Application No. 201710677047.5, dated Apr. 15, 2019 (dated Apr. 15, 2019)—10 pages (English translation—10 pages).
Evolved Universal Terrestrial Radio Access (E-UTRA), Physical channels and modulation (release 13), 3GPP TS 36.211 V13.1.0 (Mar. 2016) (Year: 2016).
Extended European Search Report for European Application No. 18843237.1, dated Jun. 4, 2020 (dated Jun. 4, 2020)—7 pages.
Huawei et al., "SRS switching among CCs and bandwidth parts," 3GPP TSG RAN WG1 NR Ad-Hoc Meeting, R1-1709976, Qingdao, China, Jun. 27-30, 2017, 4 pages.
Huawei, HiSilicon: "SRS switching among CCs and bandwidth parts," R1-1709976, 3GPP TSG RAN WG1 NR Ad-Hoc Meeting, Qingdao, China, Jun. 27, 2017, 4 pages.
Intel Corporation, "On QCL for different BW parts and other QCL details," 3GPP TSG RAN WG1 NR Ad-Hoc#2, R1-1710539, Qingdao, P.R. China, Jun. 27-30, 2017, 5 pages.
Intel Corporation, "On UL control channel design aspects for URLLC," 3GPP TSG RAN WG1 NR Ad-Hoc#2, R1-1710560, Qingdao, P.R. China, Jun. 27-30, 2017, 4 pages.
Intel Corporation: "On QCL for different BW parts and other QCL details" R1-1710539, 3GPP TSG RAN WG1 NR Ad-Hoc#2, Qingdao, P.R. China, Jun. 27, 2017, 5 pages.
Intel Corporation: "On UL control channel design aspects for URLLC" R1-1710560, 3GPP TSG RAN WG1 NR Ad-Hoc#2, Qingdao, P.R. China, Jun. 27, 2017, 4 pages.
International Search Report and Written Opinion for International Application No. PCT/CN2018/096813, dated Feb. 20, 2020 (Feb. 20, 2020)—9 pages (English translation—6 pages).
Leading WG, "New Radio (NR) Access Technology," 3GPP TSG RAN meeting #76, RP-1711505, West Palm Beach, USA, Jun. 5-8, 2017, 218 pages.
LG Electronics, "Discussion on uplink power control for NR," 3GPP TSG RAN WG1 NR Ad-Hoc#2, R1-1710356, Qingdao, P.R. China, Jun. 27-30, 2017, 6 pages.
LG Electronics, "Discussion on uplink power headroom report for NR," 3GPP TSG RAN WG1 NR Ad-Hoc#2, R1-1710357, Qingdao, P.R. China, Jun. 27-30, 2017, 4 pages.

(56) References Cited

OTHER PUBLICATIONS

LG Electronics: "Discussion on uplink power control for NR" R1-1710356, 3GPP TSG RAN WG1 NR Ad-Hoc#2, Qingdao, P.R. China, Jun. 27, 2017, 6 pages.
LG Electronics: "Discussion on uplink power headroom report for NR" R1-1710357, 3GPP TSG RAN WG1 NR Ad-Hoc#2, Qingdao, P.R. China, Jun. 27, 2017, 4 pages.
NonFinal Office Action received in U.S. Appl. No. 16/637,408, dated Oct. 18, 2021, 24 pages.
NonFinal Office Action received in U.S. Appl. No. 16/785,365, dated Jan. 10, 2022, 16 pages.
NonFinal Office Action received in U.S. Appl. No. 16/785,365, dated Mar. 18, 2021, 15 pages.
NonFinal Office Action received in U.S. Appl. No. 16/785,365 dated Oct. 6, 2020, 18 pages.
NonFinal Office Action, received in U.S. Appl. No. 16/637,408, dated Jul. 18, 2022, 22 pages.
NTT Docomo, Inc.: "Status Report to TSG re: New Radio (NR) Access Technology," RP-1711505, 3GPP TSG RAN meeting #76, West Palm Beach, USA, Jun. 5, 2017, 219 pages.
RAN1 Chairman's Notes, 3GPP TSG RAN NR Ad-Hoc#2, Quigdao, PR China, Jun. 27-30, 2017 (Year: 2017).
Search Report and Written Opinion received in International Application No. PCT/CN2018/096813 dated Oct. 17, 2018, with translation, 15 pages.

\* cited by examiner

DOWNLINK TRANSMISSION POWER CONTROL ON BWP

CROSS-REFERENCE TO RELATED APPLICATIONS

The present application claims the benefit of and is a continuation application of U.S. patent application Ser. No. 17/963,852 filed on Oct. 11, 2022, which is a continuation application of U.S. patent application Ser. No. 16/785,365 filed on Feb. 7, 2020, which is a continuation of U.S. application Ser. No. 16/637,408 filed on Feb. 7, 2020, which is the U.S. national phase of PCT Application No. PCT/CN2018/096813 filed on Jul. 24, 2018, which claims priority to Chinese Patent Application No. 201710677047.5 filed on Aug. 9, 2017, which are incorporated herein by reference in their entirety.

TECHNICAL FIELD

The present disclosure relates to the field of communication technology, in particular to a User Equipment (UE), a network device and non-transitory computer storage media.

BACKGROUND

Along with the development of the mobile communication technology, a further mobile communication system intends to use a large system bandwidth. For example, a 5th-Generation (5G) mobile communication system may support a system bandwidth of 100 MHz or 400 MHz, which is far greater than a maximum system bandwidth (i.e., 20 MHz) supported by a Long Term Evolution (LTE) system, so as to support a larger system capacity and a larger user throughput.

When a large system bandwidth is adopted by the mobile communication system, different UEs may support different bandwidths. In order to enable a UE supporting a smaller bandwidth to access a part of a bandwidth in a large bandwidth network, such a concept as Bandwidth Part (BWP) has been introduced. To be specific, taking the 5G mobile communication system as an example, the system bandwidth may be divided into one or more BWPs, and one or more BWPs may be configured for each UE. However, in the related art, usually power management is performed on the basis of carriers, and there is currently no scheme for the power management over the BWPs.

SUMMARY

In one aspect, the present disclosure provides in some embodiments a method, performed by a User Equipment (UE), the method comprising: receiving downlink transmission on a second target Bandwidth Part (BWP) in accordance with one or more target downlink power adjustment parameters among downlink power adjustment parameters configured by a network device, wherein the one or more target downlink power adjustment parameters correspond to the second target BWP. Specifically the downlink power adjustment parameters are configured by the network device for respective BWPs separately, wherein each of BWPs is continuous physical resources in a frequency domain within a given carrier, and a number of the continuous physical resources contained in each BWP is less than a number of physical resources contained in the given carrier in the frequency domain.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

Figure 1:
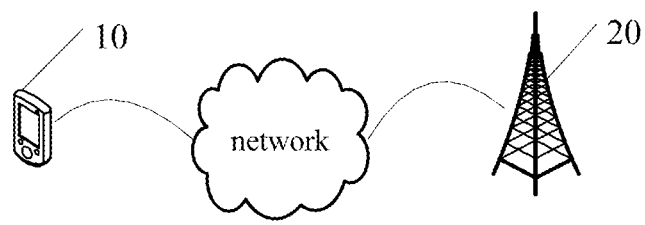
FIG. 1 is a schematic view showing an available network according to some embodiments of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the embodiments of the present disclosure, uplink power control is used to control transmission power of different uplink physical channels, e.g., the uplink power control may include Physical Uplink Shared Channel (PUSCH) power control, Physical Uplink Control Channel (PUCCH) power control, Sounding Reference Signal (SRS) power control, etc.

Taking an LTE system an example, a Single Carrier Frequency Division Multiple Access (SC-FDMA) waveform is adopted for the uplink transmission in the LTE system, and an open-close plus closed-loop mode is adopted for the uplink power control. Taking a PUSCH as an example, at a serving cell c, the transmission power of a UE within a subframe i may be calculated through $$P_{PUSCH,c}(i) = \min\left\{\begin{array}{l} P_{CMAX,c}(i), \\ 10\log_{10}(M_{PUSCH,c}(i)) + P_{0\_PUSCH,c}(j) + \alpha_c(j) \cdot PL_c + \Delta_{TF,c}(i) + f_c(i) \end{array}\right\},$$

wherein $P_{CMAX,c}(i)$ represents maximum transmission power of the UE within the subframe i at the serving cell c, $M_{PUSCH,c}(i)$ represents a bandwidth occupied by the PUSCH for the UE within the subframe i at the serving cell c, with a unit of Resource Block (RB), $P_{O\_PUSCH,c}(j)$ represents a PUSCH open-loop power target value of the UE within the subframe i at the serving cell c, j represents a PUSCH transmission type, j=0 represents semi-persistent scheduling PUSCH transmission, j=0 represents dynamic scheduling PUSCH transmission, j=1 represents PUSCH transmission carrying a random access message 3 (Msg3), $\alpha_c$ represents a path loss compensation factor at the serving cell c for partial path loss compensation, $\alpha_3 \in \{0, 0.4, 0.5, 0.6, 0.7, 0.8, 0.9, 1\}$ when j=0 or 1, $\alpha_c(j)=1$ when j=2, $PL_c$ represents a path loss measurement value at the serving cell c, $\Delta_{TF,c}(i)$ represents a power adjustment value associated with a PUSCH Modulation and Coding Scheme (MCS), and $f_c(i)$ represents a closed-loop power control command accumulated value within the subframe i at the serving cell c.

In a possible embodiment of the present disclosure, downlink power allocation is used to determine transmission power on each Resource Element (RE) for downlink transmission. Taking the LTE system as an example, the LTE system supports user-based low-speed power allocation where the setting of the following power parameters is involved.

Energy Per Resource Element (EPRE) of a pilot resource: it represents transmission power on each RE of the pilot resource, including EPRE of a Cell Reference Signal (CRS) and EPRE of a Channel State Information-Reference Signal (CSI-RS). The EPRE of the pilot resource is a cell attribute, and it is the same to all users.

EPRE of a data resource: it represents transmission power on each RE of the data resource, and it is UE-specific. A network side (e.g., a base station) may notify the UE of information about the EPRE of the data resource through Radio Resource Control (RRC) signaling.

In actual use, in some mobile communication systems supporting a relatively large bandwidth, e.g., a 5G mobile communication system, one or more BWPs may be configured for one UE. When a plurality of BWPs is configured for the UE, the BWPs may have a same configuration parameter or different configuration parameters (i.e., Numerologies).

Due to different service situations and different UE capabilities, adjacent serving cells may transmit uplink or downlink services using different BWPs at a same time point, resulting in difference interferences between the adjacent serving cells on different BWPs. In addition, due to the network deployment, one serving cell may transmit or receive different BWPs using different transmission points. When a same power control mode as the LTE system is adopted, i.e., when power control is performed on each carrier, there may exist a difference between the BWPs in terms of the transmission performance, and thereby the system performance may be reduced. Furthermore, inaccurate power control may lead to unnecessary power transmission, resulting in an increase in the power consumption as well as an intra-system interference.

Hence, in the embodiments of the present disclosure, power management may be performed on each BWP, i.e., one or more power management parameters (e.g., an uplink power control parameter and a downlink power adjustment parameter) for each BWP may be configured and processed, so as to improve the system performance.

FIG. 1 shows an available network according to some embodiments of the present disclosure. As shown in FIG. 1, the network includes a UE 10 and a network device 20. The UE 10 may communicate with the network device 20 via the network. The UE 10 may be a mobile phone, a tablet personal computer, a laptop computer, a Personal Digital Assistant (PDA), a Mobile Internet Device (MID) or a wearable device. The network device may be an evolved Node B (eNB or eNodeB), a relay, an access point, a base station in a 5G network (gNB), or a wireless network controller at a network side, which will not be particularly defined herein.

In the embodiments of the present disclosure, the UE 10 may perform transmission power control over uplink transmission on a first target BWP in accordance with one or more target uplink power control parameters corresponding to the first target BWP. Correspondingly, the network device 20 may receive the uplink transmission on the first target BWP in accordance with one or more target uplink power control parameters corresponding to the first target BWP. As a result, it is able to standardize the power control with respect to one or more BWPs.

In the embodiments of the present disclosure, the network device 20 may allocate transmission power with respect to downlink transmission on a second target BWP in accordance with one or more target downlink power adjustment parameters corresponding to the second target BWP. Correspondingly, the UE 10 may receive the downlink transmission on the second target BWP in accordance with the one or more target downlink power adjustment parameters corresponding to the second target BWP. As a result, it is able to standardize the power control with respect to one or more BWPs.

Figure 2:
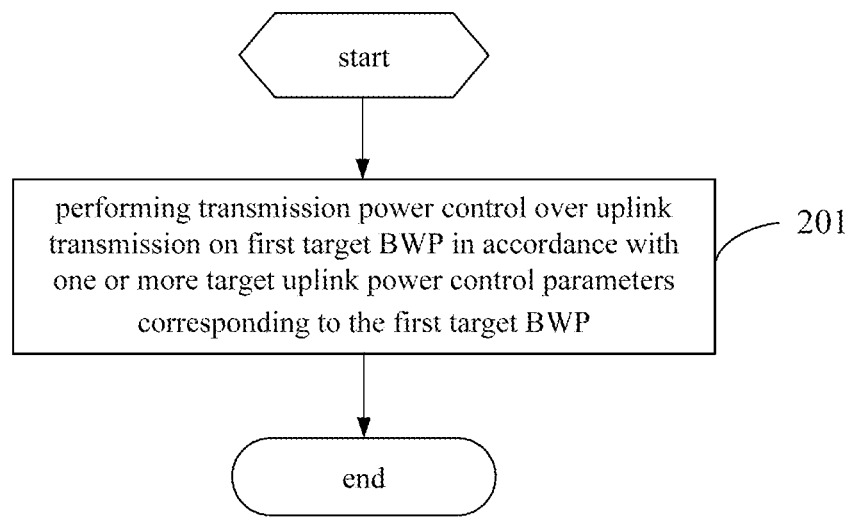
FIG. 2 is a flow chart of a power control method according to some embodiments of the present disclosure.

The present disclosure provides in some embodiments a power control method for a UE which, as shown in FIG. 2, includes Step 201 of performing transmission power control over uplink transmission on a first target BWP in accordance with one or more target uplink power control parameters corresponding to the first target BWP.

In the embodiments of the present disclosure, a system bandwidth may be divided into one or more BWPs, and the UE may support one or more BWPs. When the UE supports at least two BWPs, the first target BWP may be any one of the at least two BWPs. To be specific, one or more uplink power control parameters may be configured separately for each BWP, and the UE may control the transmission power for the uplink transmission on each BWP in accordance with the one or more uplink power control parameters for each BWP.

In a possible embodiment of the present disclosure, the one or more target uplink power control parameters may include at least one of maximum transmission power, target received power, a power compensation factor, a path loss reference, a power adjustment value, and a Transmission Power Control (TPC) command word.

In the embodiments of the present disclosure, the maximum transmission power may refer to maximum transmission power $P_{cmax,bwp}$ of the UE on each BWP. To be specific, the maximum transmission power $P_{cmax,bwp}$ of the UE on each BWP may be determined in accordance with a maximum transmission power parameter. The maximum transmission power parameter may include, but not limited to, maximum transmission power $P_{EMAX,c}$ and/or Additional Maximum Power Reduction (A-MPR).

The target received power, i.e., Po, may include, but not limited to, at least one of a power target value of a PUSCH, i.e., Po_PUSCH, a received power target value of a PUCCH, i.e., Po_PUCCH, a received power target value of an SRS, i.e., Po_SRS (or a received power target offset of the SRS, i.e., Po_SRS offset), and a received power target value of a preamble, i.e., Po_preamble.

The power compensation factor may be α mentioned hereinabove.

For the path loss reference, a network side (e.g., a base station) may configure a downlink (DL) path loss reference for each uplink (UL) BWP, e.g., a downlink BWP where a path loss needs to be measured.

The power adjustment value may include a power adjustment value associated with a transmission format, a power adjustment value associated with a PUCCH format, and a power adjustment value associated with a PUCCH antenna mode. To be specific, the power adjustment value associated with the transmission format may be configured for each uplink BWP. The power adjustment value associated with the transmission format may include an adjustment value associated with an MCS transmitted via the PUSCH, and/or an adjustment value $\beta_{offset}^{PUSCH}$ of offset Uplink Control Information (UCI) relative to the PUSCH when the UCI is carried in the PUSCH.

The power adjustment value associated with the PUCCH format may include $\Delta_{F\_PUCCH}(F)$, i.e., relative power offsets for different PUCCH formats.

The power adjustment value associated with the PUCCH antenna mode may include $\Delta_{TxD}(F')$, i.e., a power adjustment value of the transmission power for the PUCCH when transmission diversity is adopted relative to the transmission power when no transmission diversity is adopted.

To be specific, for the TPC command word, the network side (e.g., the base station) may transmit a separate TPC command word with respect to each BWP, and the UE may accumulate the TPC commands with respect to each BWP.

In this way, in the embodiments of the present disclosure, the transmission power control may be performed over the uplink transmission on the first target BWP in accordance with the one or more target uplink power control parameters corresponding to the first target BWP. As compared with the related art where the power control is performed on each carrier, it is able to improve the system performance. In addition, it is able to reduce the unnecessary power transmission, thereby to reduce the power consumption as well as the intra-system interference.

In actual use, the one or more target uplink power control parameters may be predefined in a communication protocol between the UE and the network device, or configured by the network device and transmitted to the UE.

In a possible embodiment of the present disclosure, in order to configure the power control parameter flexibly, prior to performing the transmission power control over the uplink transmission on the first target BWP in accordance with the one or more target uplink power control parameters corresponding to the first target BWP, the power control method may further include receiving one or more uplink power control parameters corresponding to each BWP from the network device.

In the embodiments of the present disclosure, the entire bandwidth may consist of one or more BWPs. When the entire bandwidth includes merely one BWP, the one or more uplink power control parameters corresponding to the BWP may be transmitted. When the entire bandwidth includes a plurality of BWPs, the one or more uplink power control parameters corresponding to each BWP may be transmitted.

In the embodiments of the present disclosure, the network side (e.g., the base station) may configure one or more uplink power control parameters for each BWP, and transmit the one or more uplink power control parameters to the UE, so that the UE may determine the uplink transmission power for each BWP in accordance with the one or more uplink power control parameters corresponding to each BWP.

In the embodiments of the present disclosure, the network device may configure the one or more uplink power control parameters for each BWP, so as to flexibly control the one or more uplink power control parameters corresponding to each BWP, e.g., to configure the one or more uplink power control parameters corresponding to each BWP in accordance with a bandwidth of each BWP and the UE capability. Through the one or more uplink power control parameters corresponding to each BWP, it is able to reduce the interference and the power consumption as possible while ensuring the uplink transmission quality.

In a possible embodiment of the present disclosure, subsequent to performing the transmission power control over the uplink transmission on the first target BWP in accordance with the one or more target uplink power control parameters corresponding to the first target BWP, the power control method may further include: with respect to an SC-FDMA mode, calculating an actual power headroom corresponding to the first target BWP in accordance with maximum transmission power corresponding to the first target BWP and actual transmission power of the PUSCH, and transmitting the actual power headroom; or with respect to an Orthogonal Frequency Division Multiple Access (OFDMA) mode, calculating a virtual power headroom in accordance with the maximum transmission power corresponding to the first target BWP and virtual transmission power of the PUSCH, and transmitting the virtual power headroom.

In the embodiments of the present disclosure, the UE may calculate the actual transmission power corresponding to the first target BWP in accordance with the one or more uplink power control parameters corresponding to the first target BWP, i.e., actual transmission power $P_{pusch,bwp}$ for the PUSCH and actual transmission power $P_{pucch,bwp}$ for the PUCCH on the first target BWP.

Meanwhile, in the embodiments of the present disclosure, with respect to the SC-FDMA mode, the actual power headroom $PHR_{bwp}$ corresponding to the first target BWP may be calculated in accordance with the maximum transmission power $P_{cmax,bwp}$ corresponding to the first target BWP and actual transmission power $P_{pusch}$ for the PUSCH, e.g., $PHR_{bwp}=P_{cmax,bwp}-P_{pusch}$. To be specific, when $PHR_{bwp}$ is positive, it means that the transmission power of the UE has not reached a maximum value yet, and more bandwidth resources may be allocated for the UE, so as to transmit more data. When $PHR_{bwp}$ is negative, it means that the transmission power of the UE has reached the maximum value, and the quantity of the bandwidth resources for the UE needs to be reduced, so as to ensure the service quality.

In a possible embodiment of the present disclosure, with respect to an OFMDA mode, the UE May calculate the virtual power headroom $HR_{bwp\_virtual}$ corresponding to the BWP in accordance with the maximum transmission power $P_{cmax,bwp}$ corresponding to the BWP and the virtual transmission power $P_{pusch}$ virtual for the PUSCH on the BWP, e.g., $PHR_{bwp\_virtual}=P_{cmax,bwp}-P_{pusch}$ virtual.

In the embodiments of the present disclosure, the actual power headroom corresponding to the first target BWP or the virtual power headroom corresponding to the first target BWP acquired through calculation may be transmitted to the network device, so that the network device may adjust the bandwidth resources for the UE in accordance with the actual power headroom corresponding to the first target BWP or the virtual power headroom corresponding to the first target BWP, thereby to improve the data transmission volume while ensuring the serving quality.

In a possible embodiment of the present disclosure, prior to performing the transmission power control over the uplink transmission on the first target BWP in accordance with the one or more target uplink power control parameters corresponding to the first target BWP, the power control method may further include: receiving a BWP adjustment command from the network device; and determining the first target BWP in accordance with the BWP adjustment command.

In the embodiments of the present disclosure, the network device may transmit the BWP adjustment command to the UE via L1/L2 signaling, so that the UE may adjust the BWP in accordance with the BWP adjustment command, and thereby determine the first target BWP.

To be specific, when a plurality of BWPs has been configured by the network device for the UE, each BWP may have relevant power control parameters. When the network device dynamically adjusts the BWPs for the UE via the L1/L2 signaling (e.g., when the network device performs dynamic switching among the plurality of pre-configured BWPs), the UE may use the power control parameter corresponding to a currently active BWP.

In a possible embodiment of the present disclosure, the BWP may be further adjusted in the following modes. In Mode 1, a central frequency point of the BWP may remain unchanged, and the BWP bandwidth may be changed; in Mode 2, the central frequency point of the BWP may be changed, and the BWP bandwidth may remain unchanged; and in Mode 3, the central frequency point of the BWP may be changed, and the BWP bandwidth may be changed too.

It should be appreciated that, in Mode 1, no Radio Frequency (RF) retuning is required.

Figure 3:
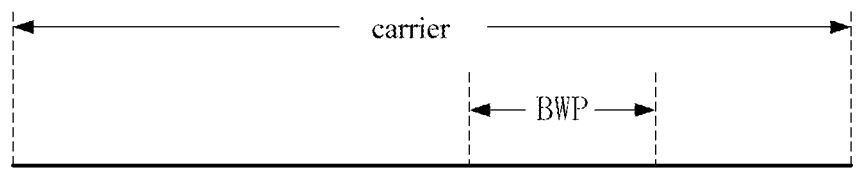
FIG. 3 is a schematic view showing a BWP application scenario according to some embodiments of the present disclosure.
Figure 4:
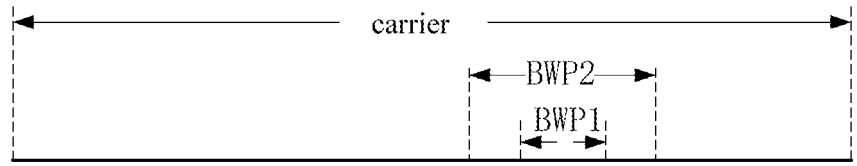
FIG. 4 is another schematic view showing the BWP application scenario according to some embodiments of the present disclosure.
Figure 5:
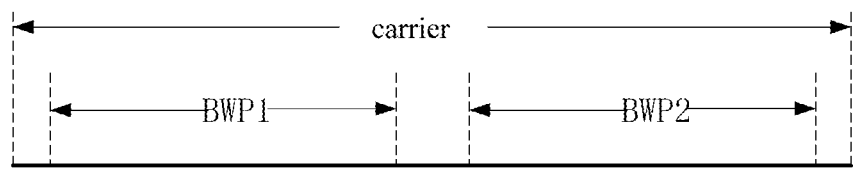
FIG. 5 is yet another schematic view showing the BWP application scenario according to some embodiments of the present disclosure.

For example, FIG. 3 through FIG. 5 show several BWP application scenarios respectively.

In Scenario 1, the UE may access one BWP of the system bandwidth, as shown in FIG. 3.

In Scenario 2, the BWP for the UE may be adjusted, with the central frequency point of the BWP being unchanged and the BWP bandwidth being changed, as shown in FIG. 4.

In Scenario 3, the UE may access two BWPs (i.e., BWP 1 and BWP 2) of the system bandwidth simultaneously, and the two BWPs may have different numerologies, as shown in FIG. 5.

In the embodiments of the present disclosure, the UE may adjust the BWP in accordance with the BWP adjustment command, so as to conveniently adjust the bandwidth resources for the UE.

Figure 6:
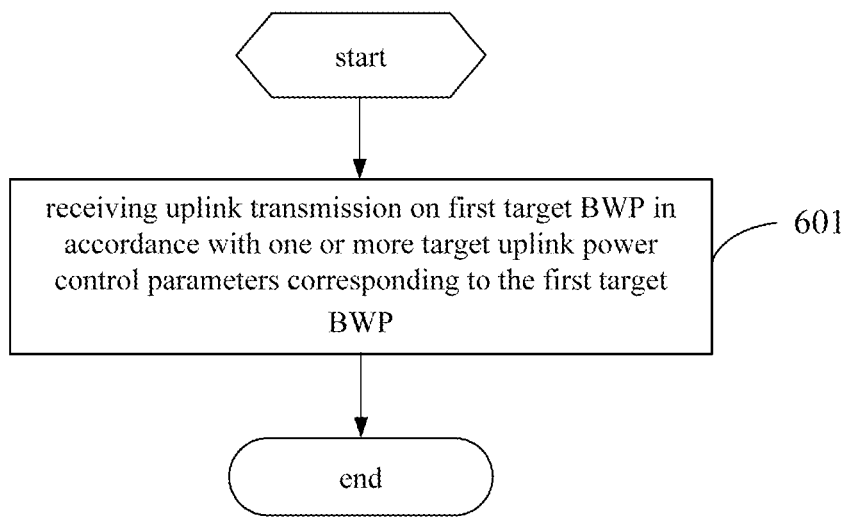
FIG. 6 is a flow chart of a reception method according to some embodiments of the present disclosure.

The present disclosure further provides in some embodiments a reception method for a network device which, as shown in FIG. 6, includes Step 601 of receiving uplink transmission on a first target BWP in accordance with one or more target uplink power control parameters corresponding to the first target BWP.

In the embodiments of the present disclosure, the network device may receive the uplink transmission on the first target BWP in accordance with the one or more target uplink power control parameters corresponding to the first target BWP.

To be specific, in the embodiments of the present disclosure, the one or more uplink power control parameters may be separately configured for each BWP, and the network device may receive the uplink transmission on each BWP in accordance with the one or more uplink power control parameters corresponding to each BWP.

In a possible embodiment of the present disclosure, the one or more target uplink power control parameters may include at least one of maximum transmission power, target received power, a power compensation factor, a path loss reference, a power adjustment value, and a TPC command word.

In the embodiments of the present disclosure, the maximum transmission power may refer to maximum transmission power $P_{cmax,bwp}$ of the UE on each BWP. To be specific, the maximum transmission power $P_{cmax,bwp}$ of the UE on each BWP may be determined in accordance with a maximum transmission power parameter. The maximum transmission power parameter may include, but not limited to, maxim transmission power $P_{EMAX,c}$ and/or A-MPR.

The target received power, i.e., Po, may include, but not limited to, at least one of a power target value of a PUSCH, i.e., Po_PUSCH, a received power target value of a PUCCH, i.e., Po_PUCCH, a received power target value of an SRS, i.e., Po_SRS (or a received power target offset of the SRS, i.e., Po_SRS offset), and a received power target value of a preamble, i.e., Po_preamble.

The power compensation factor may be α mentioned hereinabove.

For the path loss reference, a network side (e.g., a base station) may configure a downlink (DL) path loss reference for each uplink (UL) BWP, e.g., a downlink BWP where a path loss needs to be measured.

The power adjustment value may include a power adjustment value associated with a transmission format, a power adjustment value associated with a PUCCH format, and a power adjustment value associated with a PUCCH antenna mode. To be specific, the power adjustment value associated with the transmission format may be configured for each uplink BWP. The power adjustment value associated with the transmission format may include $K_S$ and/or $\beta_{offset}^{PUSCH}$. The power offset adjustment value associated with the PUCCH format may include $\Delta_{F\_PUCCH}(F)$ The power adjustment value associated with the PUCCH antenna mode may include $\Delta_{TxD}(F')$.

To be specific, for the TPC command word, the network side (e.g., the base station) may transmit a separate TPC command word with respect to each BWP, and the UE may accumulate the TPC commands with respect to each BWP.

In this way, in the embodiments of the present disclosure, the uplink transmission may be received on the first target BWP in accordance with the one or more target uplink power control parameters corresponding to the first target BWP. As compared with the related art where the power control is performed on each carrier, it is able to improve the system performance. In addition, it is able to reduce the unnecessary power transmission, thereby to reduce the power consumption as well as the intra-system interference.

In actual use, the one or more target uplink power control parameters may be predefined in a communication protocol between the UE and the network device, or configured by the network device and transmitted to the UE.

In a possible embodiment of the present disclosure, in order to configure the power control parameter flexibly, prior to receiving the uplink transmission on the first target BWP in accordance with the one or more target uplink power control parameters corresponding to the first target BWP, the reception method may further include transmitting one or more uplink power control parameters corresponding to each BWP to the UE.

In the embodiments of the present disclosure, the network side (e.g., the base station) may configure one or more uplink power control parameters for each BWP, and transmit the one or more uplink power control parameters to the UE, so that the UE may determine the uplink transmission power for each BWP in accordance with the one or more uplink power control parameters corresponding to each BWP.

In the embodiments of the present disclosure, the network device may configure the one or more uplink power control parameters for each BWP, so as to flexibly control the one or more uplink power control parameters corresponding to each BWP, e.g., to configure the one or more uplink power control parameters corresponding to each BWP in accordance with a bandwidth of each BWP and the UE capability. Through the one or more uplink power control parameters corresponding to each BWP, it is able to reduce the interference and the power consumption as possible while ensuring the uplink transmission quality.

In a possible embodiment of the present disclosure, subsequent to receiving the uplink transmission on the first target BWP in accordance with the one or more target uplink power control parameters corresponding to the first target BWP, the reception method may further include: with respect to an SC-FDMA mode, receiving an actual power headroom corresponding to the first target BWP calculated in accordance with maximum transmission power corresponding to the first target BWP and actual transmission power of the PUSCH from the UE; or with respect to an OFDMA mode, receiving a virtual power headroom calculated in accordance with the maximum transmission power corresponding to the first target BWP and virtual transmission power of the PUSCH from the UE.

In the embodiments of the present disclosure, the UE may calculate the actual transmission power corresponding to the first target BWP in accordance with the one or more uplink power control parameters corresponding to the first target BWP, i.e., actual transmission power $P_{pusch,bwp}$ for the PUSCH and actual transmission power $P_{pucch,bwp}$ for the PUCCH on the first target BWP. In addition, the UE may calculate the actual power headroom $PHR_{bwp}$ corresponding to the first target BWP in accordance with the maximum transmission power $P_{cmax,bwp}$ corresponding to the first target BWP and actual transmission power $P_{pusch}$ for the PUSCH, e.g., $PHR_{bwp}=P_{cmax,bwp}-P_{pusch}$. To be specific, when $PHR_{bwp}$ is positive, it means that the transmission power of the UE has not reached a maximum value yet, and more bandwidth resources may be allocated for the UE, so as to transmit more data. When $PHR_{bwp}$ is negative, it means that the transmission power of the UE has reached the maximum value, and the quantity of the bandwidth resources for the UE needs to be reduced, so as to ensure the service quality.

In a possible embodiment of the present disclosure, the UE may also calculate the virtual power headroom $HR_{bwp\_virtual}$ corresponding to the BWP in accordance with the maximum transmission power $P_{cmax,bwp}$ corresponding to the BWP and the virtual transmission power $P_{pusch\_virtual}$ for the PUSCH on the BWP, e.g., $PHR_{bwp\_virtual}=P_{cmax,bwp}-P_{pusch}$ virtual.

In the embodiments of the present disclosure, the actual power headroom corresponding to the first target BWP or the virtual power headroom corresponding to the first target BWP acquired through calculation may be transmitted to the network device, so that the network device may adjust the bandwidth resources for the UE in accordance with the actual power headroom corresponding to the first target BWP or the virtual power headroom corresponding to the first target BWP, thereby to improve the data transmission volume while ensuring the serving quality.

In a possible embodiment of the present disclosure, prior to receiving the uplink transmission on the first target BWP in accordance with the one or more target uplink power control parameters corresponding to the first target BWP, the reception method may further include transmitting a BWP adjustment command indicating the first target BWP.

In the embodiments of the present disclosure, the network device may transmit the BWP adjustment command to the UE via L1/L2 signaling, so that the UE may adjust the BWP in accordance with the BWP adjustment command, and thereby determine the first target BWP.

To be specific, when a plurality of BWPs has been configured by the network device for the UE, each BWP may be configured with relevant power control parameters. When the network device dynamically adjusts the BWPs for the UE via the L1/L2 signaling (e.g., when the network device performs dynamic switching among the plurality of pre-configured BWPs), the UE may use the power control parameter corresponding to a currently active BWP.

In the embodiments of the present disclosure, the network device may transmit the BWP adjustment command indicating the first target BWP to the UE, so that the UE may perform the BWP adjustment in accordance with the BWP adjustment command, so as to conveniently adjust the bandwidth resources for the UE.

Figure 7:
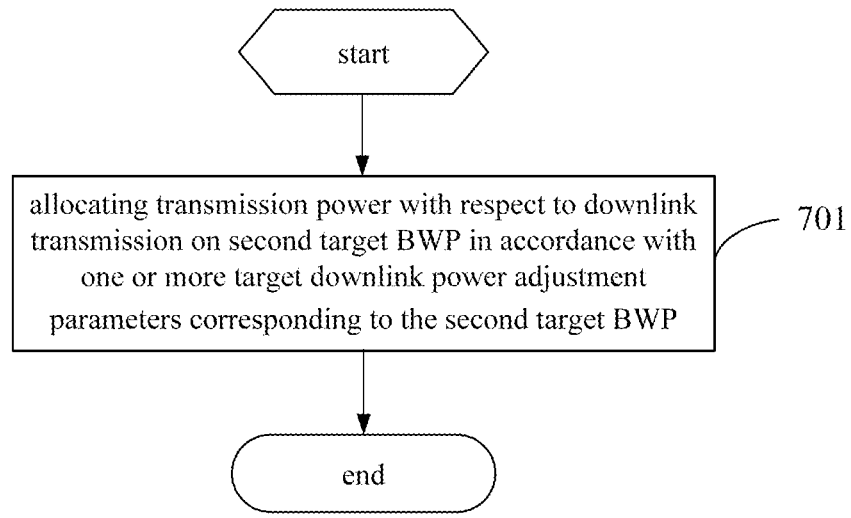
FIG. 7 is a flow chart of a power allocation method according to some embodiments of the present disclosure.

The present disclosure further provides in some embodiments a power allocation method for a network device which, as shown in FIG. 7, includes Step 701 of allocating transmission power with respect to downlink transmission on a second target BWP in accordance with one or more target downlink power adjustment parameters corresponding to the second target BWP.

In the embodiments of the present disclosure, one or more downlink power adjustment parameters may be separately configured for each BWP, and then downlink transmission power may be allocated in accordance with the one or more downlink power adjustment parameters corresponding to each BWP. In a possible embodiment of the present disclosure, when at least two BWPs have been configured by the network device for a UE, the second target BWP may be any one of the at least two BWPs.

In a possible embodiment of the present disclosure, the one or more target downlink power adjustment parameters may include at least one of EPRE of a synchronization signal, EPRE of a reference signal, and a ratio of the EPRE of the reference signal to EPRE of a downlink data signal.

In a possible embodiment of the present disclosure, the reference signal may be at least one of a Demodulation Reference Signal (DMRS), a Channel State Information-Reference Signal (CSI-RS), a Tracking Reference Signal (TRS), and a Phase Tracking Reference Signal (PTRS).

The ratio of the EPRE of the reference signal to the EPRE of the downlink data signal may include, but not limited to, at least one of a power ratio of the EPRE of the DMRS to the EPRE of the downlink data signal, a power ratio of the EPRE of the CSI-RS to the EPRE of the downlink data signal, a power ratio of the EPRE of the TRS to the EPRE of the downlink data signal, and a power ratio of the EPRE of the PTRS to the EPRE of the downlink data signal.

In actual use, the one or more downlink power adjustment parameters may be predefined in a communication protocol between the UE and the network device, or configured by the network device.

In a possible embodiment of the present disclosure, in order to configure the downlink power control parameter flexibly, prior to allocating the transmission power with respect to downlink transmission on the second target BWP in accordance with the one or more target downlink power adjustment parameters corresponding to the second target BWP, the power allocation method may further include transmitting the one or more target downlink power adjustment parameters corresponding to the second target BWP to the UE.

In the embodiments of the present disclosure, through transmitting the one or more target downlink power adjustment parameters corresponding to the second target BWP to the UE, it is able for the UE to receive the downlink transmission in accordance with the one or more target downlink power adjustment parameters.

In the embodiments of the present disclosure, one or more BWPs may be configured by the network device for the UE. When a plurality of BWPs has been configured by the network device for the UE, each BWP may be configured with corresponding downlink power adjustment parameters. The network device may transmit the downlink power adjustment parameters corresponding to each BWP to the UE, so that the UE may receive the downlink transmission on each BWP in accordance with the downlink power adjustment parameters corresponding to each BWP.

In a possible embodiment of the present disclosure, when the plurality of BWPs has been configured by the network device for the UE, corresponding power control parameter (e.g., downlink power adjustment parameters) may be configured for each BWP. When the network device dynamically adjusts the BWPs for the UE via L1/L2 signaling (e.g., when the network device performs dynamic switching among the plurality of pre-configured BWPs), the UE may use the power control parameter corresponding to a currently active BWP.

In this way, in the embodiments of the present disclosure, the transmission power may be allocated with respect to the downlink transmission on the second target BWP in accordance with the one or more target downlink power adjustment parameters corresponding to the second target BWP. As compared with the related art where the power control is performed on each carrier, it is able to improve the system performance. In addition, it is able to reduce the unnecessary power transmission, thereby to reduce the power consumption as well as the intra-system interference.

Figure 8:
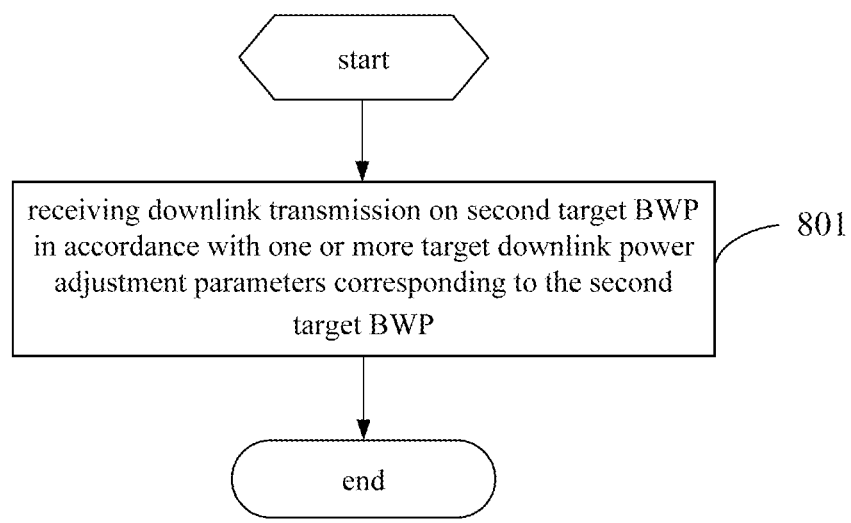
FIG. 8 is a flow chart of a reception method according to some embodiments of the present disclosure.

The present disclosure further provides in some embodiments a reception method for a UE which, as shown in FIG. 8, includes Step 801 of receiving downlink transmission on a second target BWP in accordance with one or more target downlink power adjustment parameters corresponding to the second target BWP.

In the embodiments of the present disclosure, one or more downlink power adjustment parameters may be separately configured for each BWP, and then downlink transmission may be received in accordance with the one or more downlink power adjustment parameters corresponding to each BWP. In a possible embodiment of the present disclosure, when at least two BWPs have been configured by the network device for the UE, the second target BWP may be any one of the at least two BWPs.

To be specific, the UE may receive the downlink transmission on the second target BWP in accordance with the one or more target downlink power adjustment parameters corresponding to the second target BWP.

In a possible embodiment of the present disclosure, the one or more target downlink power adjustment parameters may include at least one of EPRE of a synchronization signal, EPRE of a reference signal, and a ratio of the EPRE of the reference signal to EPRE of a downlink data signal.

In a possible embodiment of the present disclosure, the reference signal may be at least one of a DMRS, a CSI-RS, a TRS and a PTRS.

To be specific, the reference signal may be at last one of a Demodulation Reference Signal (DMRS), a Channel State Information-Reference Signal (CSI-RS), a Tracking Reference Signal (TRS), and a Phase Tracking Reference Signal (PTRS).

The ratio of the EPRE of the reference signal to the EPRE of the downlink data signal may include, but not limited to, at least one of a power ratio of the EPRE of the DMRS to the EPRE of the downlink data signal, a power ratio of the EPRE of the CSI-RS to the EPRE of the downlink data signal, a power ratio of the EPRE of the TRS to the EPRE of the downlink data signal, and a power ratio of the EPRE of the PTRS to the EPRE of the downlink data signal.

In actual use, the one or more downlink power adjustment parameters may be predefined in a communication protocol between the UE and the network device, or configured by the network device.

In a possible embodiment of the present disclosure, in order to configure the downlink power control parameter flexibly, prior to receiving the downlink transmission on the second target BWP in accordance with the one or more target downlink power adjustment parameters corresponding to the second target BWP, the reception method may further include receiving the one or more target downlink power adjustment parameters corresponding to the second BWP from the network device.

In the embodiments of the present disclosure, one or more BWPs may be configured by the network device for the UE. When a plurality of BWPs has been configured by the network device for the UE, each BWP may be configured with corresponding downlink power adjustment parameters. The network device may transmit the downlink power adjustment parameters corresponding to each BWP to the UE, so that the UE may receive the downlink transmission on each BWP in accordance with the downlink power adjustment parameters corresponding to each BWP.

In this way, in the embodiments of the present disclosure, the downlink transmission may be received on the second target BWP in accordance with the one or more target downlink power adjustment parameters corresponding to the second target BWP. As compared with the related art where the power control is performed on each carrier, it is able to improve the system performance. In addition, it is able to reduce the unnecessary power transmission, thereby to reduce the power consumption as well as the intra-system interference.

It should be appreciated that, the power control method, the power allocation method and the reception methods mentioned hereinabove may be applied to a 5G mobile communication system, or any other mobile communication system where carrier segmentation is performed, which will not be particularly defined herein.

Figure 9:
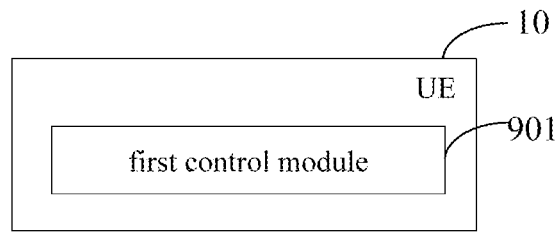
FIG. 9 is a schematic view showing a UE according to some embodiments of the present disclosure.

The present disclosure further provides in some embodiments a UE 10 which, as shown in FIG. 9, includes a first control module 901 configured to perform transmission power control over uplink transmission on a first target BWP in accordance with one or more target uplink power control parameters corresponding to the first target BWP.

Figure 10:
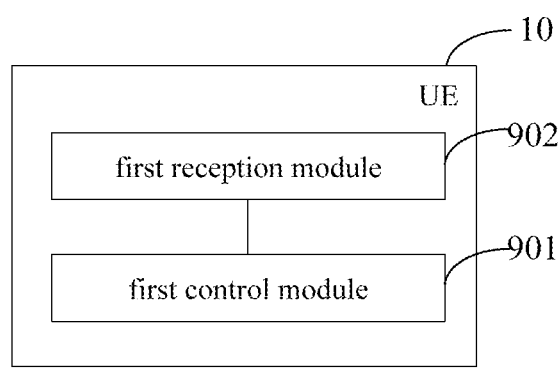
FIG. 10 is another schematic view showing the UE according to some embodiments of the present disclosure.

In a possible embodiment of the present disclosure, as shown in FIG. 10, the UE 10 may further include a first reception module 902 configured to, prior to performing the transmission power control over the uplink transmission on the first target BWP in accordance with the one or more target uplink power control parameters corresponding to the first target BWP, receive one or more uplink power control parameters corresponding to each BWP from a network device.

In a possible embodiment of the present disclosure, the one or more target uplink power control parameters may include at least one of maximum transmission power, target received power, a power compensation factor, a path loss reference, a power adjustment value, and a TPC command word.

Figure 11:
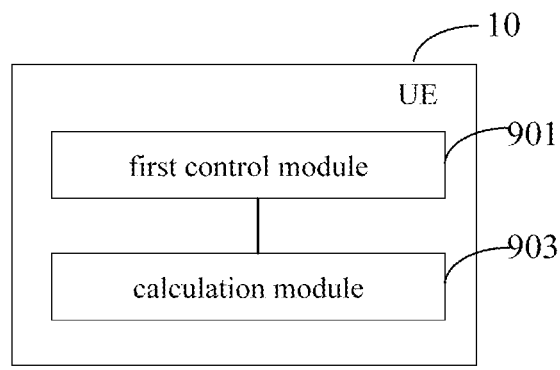
FIG. 11 is yet another schematic view showing the UE according to some embodiments of the present disclosure.

In a possible embodiment of the present disclosure, as shown in FIG. 11, the UE 10 may further include a calculation module 903 configured to: subsequent to performing the transmission power control over the uplink transmission on the first target BWP in accordance with the one or more target uplink power control parameters corresponding to the first target BWP, calculate an actual power headroom corresponding to the first target BWP in accordance with maximum transmission power corresponding to the first target BWP and actual transmission power of a PUSCH, and transmit the actual power headroom; or subsequent to performing the transmission power control over the uplink transmission on the first target BWP in accordance with the one or more target uplink power control parameters corresponding to the first target BWP, calculate a virtual power headroom in accordance with the maximum transmission power corresponding to the first target BWP and virtual transmission power of the PUSCH, and transmit the virtual power headroom.

Figure 12:
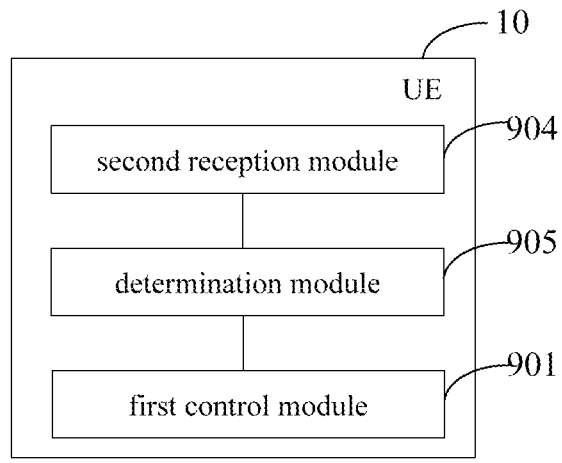
FIG. 12 is still yet another schematic view showing the UE according to some embodiments of the present disclosure.

In a possible embodiment of the present disclosure, as shown in FIG. 12, the UE 10 may further include: a second reception module 904 configured to, prior to performing the transmission power control over the uplink transmission on the first target BWP in accordance with the one or more target uplink power control parameters corresponding to the first target BWP, receive a BWP adjustment command from the network device; and a determination module 905 configured to determine the first target BWP in accordance with the BWP adjustment command.

The UE 10 is capable of implementing the procedures of the power control method in FIG. 2 with a same technical effect, which will thus not be particularly defined herein.

According to the UE 10 in the embodiments of the present disclosure, the first control module 901 may perform transmission power control over the uplink transmission on the first target BWP in accordance with the one or more target uplink power control parameters corresponding to the first target BWP. As a result, it is able to control the transmission power with respect to the BWP, thereby to standardize the power control with respect to one or more BWPs.

Figure 13:
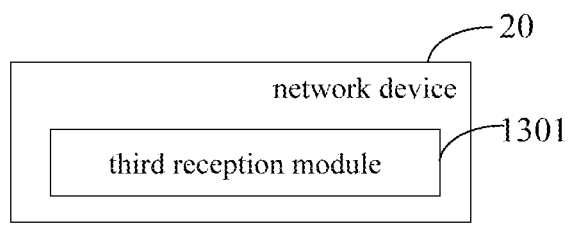
FIG. 13 is a schematic view showing a network device according to some embodiments of the present disclosure.

The present disclosure further provides in some embodiments a network device 20 which, as shown in FIG. 13, includes a third reception module 1301 configured to receive uplink transmission on a first target BWP in accordance with one or more target uplink power control parameters corresponding to the first target BWP.

Figure 14:
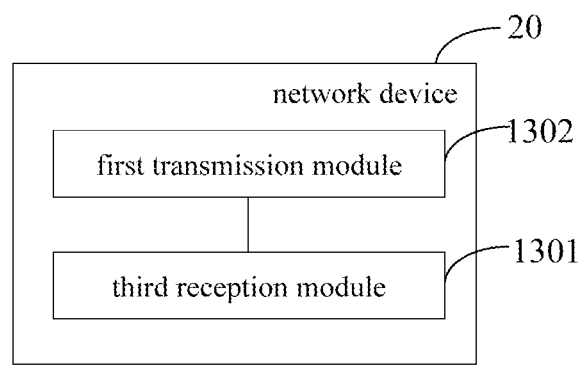
FIG. 14 is another schematic view showing the network device according to some embodiments of the present disclosure.

In a possible embodiment of the present disclosure, as shown in FIG. 14, the network device 20 may further include a first transmission module 1302 configured to, prior to receiving the uplink transmission on the first target BWP in accordance with the one or more target uplink power control parameters corresponding to the first target BWP, transmit one or more uplink power control parameters corresponding to each BWP to the UE.

In a possible embodiment of the present disclosure, the one or more target uplink power control parameters may include at least one of maximum transmission power, target received power, a power compensation factor, a path loss reference, a power adjustment value, and a TPC command word.

Figure 15:
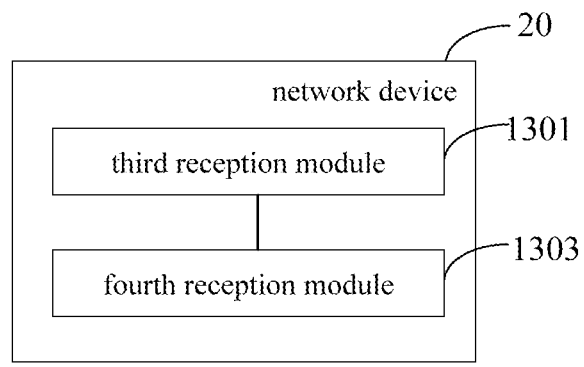
FIG. 15 is yet another schematic view showing the network device according to some embodiments of the present disclosure.

In a possible embodiment of the present disclosure, as shown in FIG. 15, the network device 20 may further include a fourth reception module 1303 configured to: subsequent to receiving the uplink transmission on the first target BWP in accordance with the one or more target uplink power control parameters corresponding to the first target BWP, receive an actual power headroom corresponding to the first target BWP calculated in accordance with maximum transmission power corresponding to the first target BWP and actual transmission power of the PUSCH from the UE; or subsequent to receiving the uplink transmission on the first target BWP in accordance with the one or more target uplink power control parameters corresponding to the first target BWP, receive a virtual power headroom calculated in accordance with the maximum transmission power corresponding to the first target BWP and virtual transmission power of the PUSCH from the UE.

Figure 16:
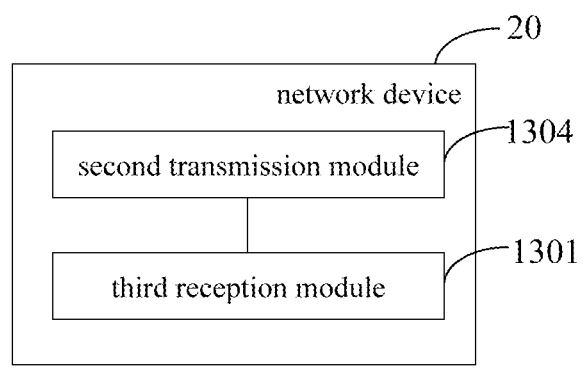
FIG. 16 is still yet another schematic view showing the network device according to some embodiments of the present disclosure.

In a possible embodiment of the present disclosure, as shown in FIG. 16, the network device 20 may further include a second transmission module 1304 configured to, prior to receiving the uplink transmission on the first target BWP in accordance with the one or more target uplink power control parameters corresponding to the first target BWP, transmit a BWP adjustment command indicating the first target BWP.

The network device 20 is capable of implementing the procedures of the reception method in FIG. 6 with a same technical effect, which will thus not be particularly defined herein.

According to the network device 20 in the embodiments of the present disclosure, the third reception module 1301 may receive the uplink transmission on the first target BWP in accordance with the one or more target uplink power control parameters corresponding to the first target BWP. As a result, it is able to control the transmission power with respect to the BWP, thereby to standardize the power control with respect to one or more BWPs.

Figure 17:
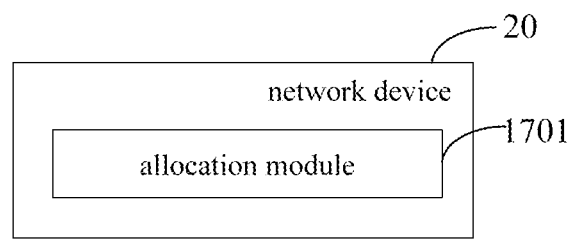
FIG. 17 is still yet another schematic view showing the network device according to some embodiments of the present disclosure.

The present disclosure further provides in some embodiments a network device 20 which, as shown in FIG. 17, includes an allocation module 1701 configured to allocate transmission power with respect to downlink transmission on a second target BWP in accordance with one or more target downlink power adjustment parameters corresponding to the second target BWP.

Figure 18:
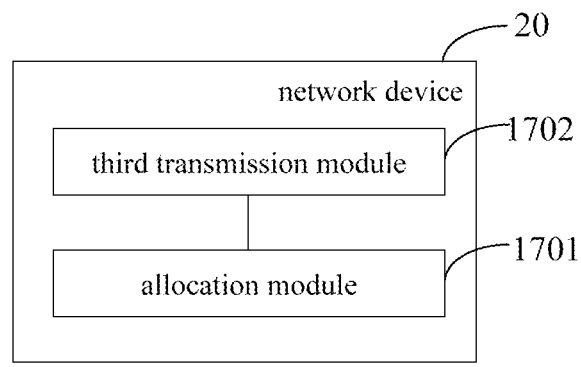
FIG. 18 is still yet another schematic view showing the network device according to some embodiments of the present disclosure.

In a possible embodiment of the present disclosure, as shown in FIG. 18, the network device 20 may further include a third transmission module 1702 configured to transmit the one or more target downlink power adjustment parameters corresponding to the second target BWP to the UE.

In a possible embodiment of the present disclosure, the one or more target downlink power adjustment parameters may include at least one of EPRE of a synchronization signal, EPRE of a reference signal, and a ratio of the EPRE of the reference signal to EPRE of a downlink data signal.

In a possible embodiment of the present disclosure, the reference signal may be at least one of a DMRS, a CSI-RS, a TRS, and a PTRS.

The network device 20 is capable of implementing the procedures of the power allocation method in FIG. 7 with a same technical effect, which will thus not be particularly defined herein.

According to the network device 20 in the embodiments of the present disclosure, the allocation module 1701 may allocate the transmission power with respect to the downlink transmission on the second target BWP in accordance with the one or more target downlink power adjustment parameters corresponding to the second target BWP. As a result, it is able to control the transmission power with respect to the BWP, thereby to standardize the power control with respect to one or more BWPs.

Figure 19:
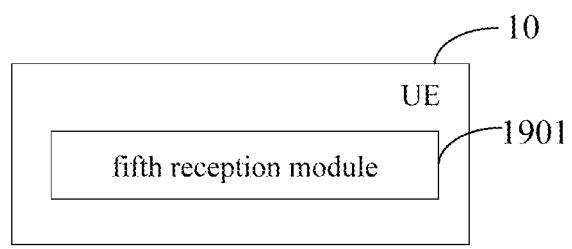
FIG. 19 is still yet another schematic view showing the UE according to some embodiments of the present disclosure.

The present disclosure further provides in some embodiments a UE 10 which, as shown in FIG. 19, includes a fifth reception module 1901 configured to receive downlink transmission on a second target BWP in accordance with one or more target downlink power adjustment parameters corresponding to the second target BWP.

Figure 20:
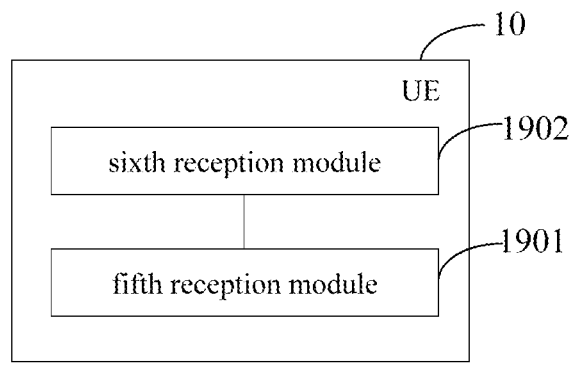
FIG. 20 is still yet another schematic view showing the UE according to some embodiments of the present disclosure.

In a possible embodiment of the present disclosure, as shown in FIG. 20, the UE 10 may further include a sixth reception module 1902 configured to receive the one or more target downlink power adjustment parameters corresponding to the second BWP from a network device.

In a possible embodiment of the present disclosure, the one or more target downlink power adjustment parameters may include at least one of EPRE of a synchronization signal, EPRE of a reference signal, and a ratio of the EPRE of the reference signal to EPRE of a downlink data signal.

In a possible embodiment of the present disclosure, the reference signal may be at least one of a DMRS, a CSI-RS, a TRS, and a PTRS.

The UE 10 is capable of implementing the procedures of the reception method in FIG. 8 with a same technical effect, which will thus not be particularly defined herein.

According to the UE 10 in the embodiments of the present disclosure, the fifth reception module 1901 may receive the downlink transmission on the second target BWP in accordance with the one or more target downlink power adjustment parameters corresponding to the second target BWP. As a result, it is able to control the transmission power with respect to the BWP, thereby to standardize the power control with respect to one or more BWPs.

The present disclosure further provides in some embodiments a UE, including a memory, a processor, and a computer program stored in the memory and executed by the processor. The processor is configured to execute the computer program so as to implement the above-mentioned power control method in FIG. 2 or the above-mentioned reception method in FIG. 8 with a same technical effect, which will thus not be particularly defined herein.

The present disclosure further provides in some embodiments a network device, including a memory, a processor, and a computer program stored in the memory and executed by the processor. The processor is configured to execute the computer program so as to implement the above-mentioned reception method in FIG. 6 or the above-mentioned power allocation method in FIG. 7 with a same technical effect, which will thus not be particularly defined herein.

The present disclosure further provides in some embodiments a computer-readable storage medium storing therein a computer program. The computer program is executed by a processor so as to implement the above-mentioned power control method in FIG. 2 or the above-mentioned reception method in FIG. 8 with a same technical effect, which will thus not be particularly defined herein.

The present disclosure further provides in some embodiments a computer-readable storage medium storing therein a computer program. The computer program is executed by a processor so as to implement the above-mentioned reception method in FIG. 6 or the above-mentioned power allocation method in FIG. 7 with a same technical effect, which will thus not be particularly defined herein.

Figure 21:
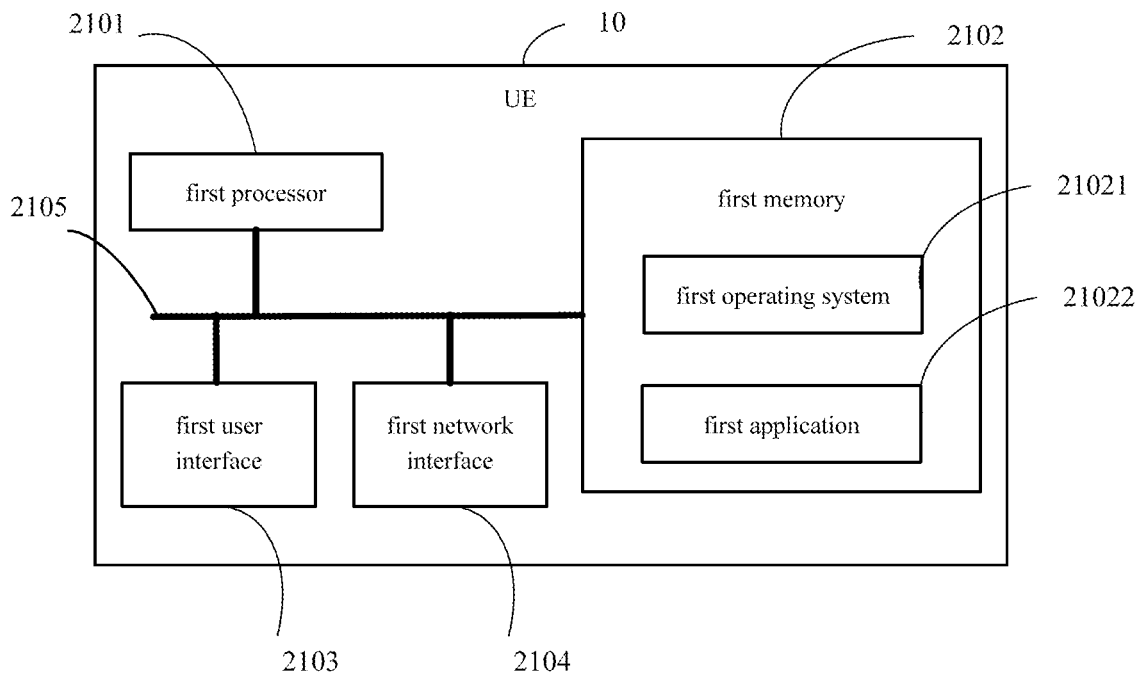
FIG. 21 is still yet another schematic view showing the UE according to some embodiments of the present disclosure.

The present disclosure further provides in some embodiments a UE 10 which, as shown in FIG. 21, includes at least one first processor 2101, a first memory 2102, at least one first network interface 2104 and a first user interface 2103. The components of the UE 10 may be coupled together through a first bus system 2105. It should be appreciated that, the first bus system 2105 is configured to achieve connection and communication among the components. Apart from a data bus, the first bus system 2105 may further include a power source bus, a control bus and a state signal bus. For clarification, all these buses in FIG. 21 may be collectively called as first bus system 2105.

The first user interface 2103 may include a display, a keyboard or a pointing device (e.g., mouse, track ball, touch plate or touch panel).

It should be appreciated that, the first memory 2102 may be a volatile memory, a nonvolatile memory or both. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but non-restrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The first memory 2102 intends to include, but not limited to, the above-mentioned and any other appropriate memories.

In a possible embodiment of the present disclosure, the following elements may be stored in the first memory 2102: an executable module or data structure, a subset or an extended set thereof, a first operating system 21021 and a first application 21022.

The first operating system 21021 may include various system programs, e.g., a framework layer, a core layer and a driving layer, so as to implement various basic services and process hardware-based tasks. The first application 21022 may include various applications, e.g., Media Player and Browser, so as to implement various application services. The programs for implementing the above-mentioned method may be included in the first application 21022.

In the embodiments of the present disclosure, the UE 10 may further include a computer program stored in the first memory 2102 and executed by the first processor 2101, e.g., a computer program in the first application memory 21022. The first processor 2101 is configured to execute the computer program so as to perform transmission power control over uplink transmission on a first target BWP in accordance with one or more target uplink power control parameters corresponding to the first target BWP.

The above-mentioned method may be applied to, or implemented by, the first processor 2101. The first processor 2101 may be an integrated circuit (IC) having a signal processing capability. During the implementation, the steps of the above-mentioned method may be completed through an integrated logic circuit of hardware in the first processor 2101 or instructions in the form of software. The first processor 2101 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the first memory 2102, and the first processor 2101 may read information stored in the first memory 2102 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the first memory and executed by the first processor. The first memory may be implemented inside or outside the first processor.

In a possible embodiment of the present disclosure, the first processor 2101 is further configured to execute the computer program, so as to receive one or more uplink power control parameters corresponding to each BWP from a network device.

In a possible embodiment of the present disclosure, the one or more target uplink power control parameters may include at least one of maximum transmission power, target received power, a power compensation factor, a path loss reference, a power adjustment value, and a TPC command word.

In a possible embodiment of the present disclosure, the first processor 2101 is further configured to: subsequent to performing the transmission power control over the uplink transmission on the first target BWP in accordance with the one or more target uplink power control parameters corresponding to the first target BWP, calculate an actual power headroom corresponding to the first target BWP in accordance with maximum transmission power corresponding to the first target BWP and actual transmission power of a PUSCH, and transmit the actual power headroom; or subsequent to performing the transmission power control over the uplink transmission on the first target BWP in accordance with the one or more target uplink power control parameters corresponding to the first target BWP, calculate a virtual power headroom in accordance with the maximum transmission power corresponding to the first target BWP and virtual transmission power of the PUSCH, and transmit the virtual power headroom.

In a possible embodiment of the present disclosure, the first processor 2101 is further configured to: receive a BWP adjustment command from the network device; and determine the first target BWP in accordance with the BWP adjustment command.

The UE 10 is capable of implementing the procedures of the above-mentioned UE, which will thus not be particularly defined herein.

According to the UE 10 in the embodiments of the present disclosure, the transmission power control may be performed over the uplink transmission on the first target BWP in accordance with the one or more target uplink power control parameters corresponding to the first target BWP. As a result, it is able to control the transmission power with respect to the BWP, thereby to standardize the power control with respect to one or more BWPs.

Figure 22:
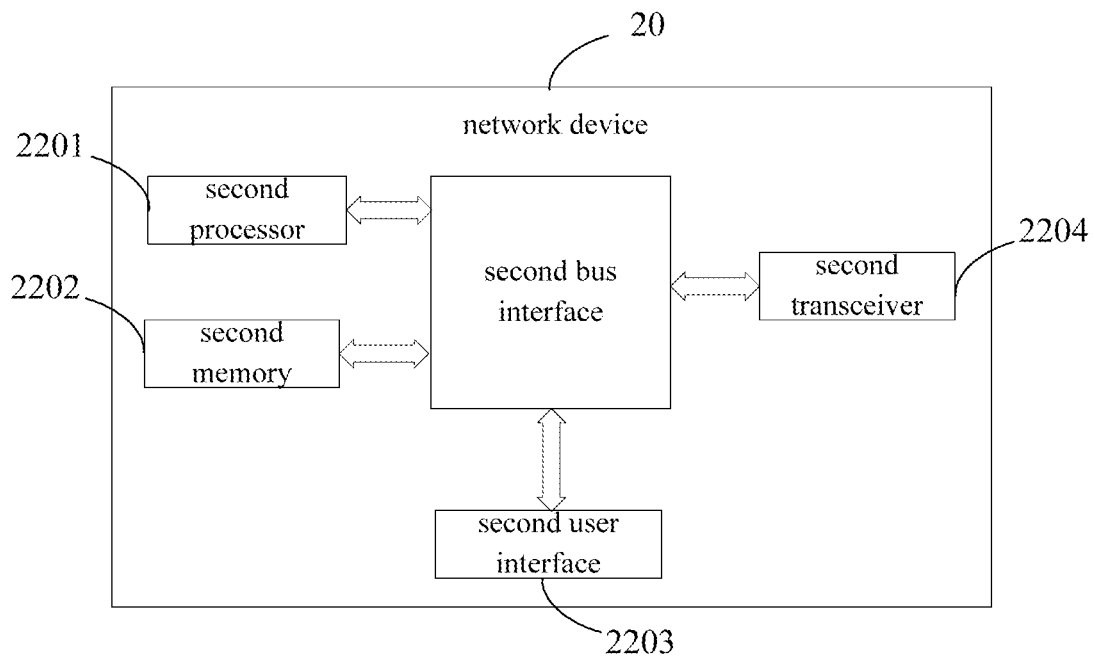
FIG. 22 is still yet another schematic view showing the network device according to some embodiments of the present disclosure.

The present disclosure further provides in some embodiments a network device 20 which, as shown in FIG. 22, includes a second processor 2201, a second memory 2202, a second user interface 2203, a second transceiver 2204 and a second bus interface.

In the embodiments of the present disclosure, the network device 20 may further include a computer program stored in the second memory 2202 and executed by the second processor 2201. The second processor 2201 is configured to execute the computer program so as to receive uplink transmission on a first target BWP in accordance with one or more target uplink power control parameters corresponding to the first target BWP.

In FIG. 22, bus architecture may include a number of buses and bridges connected to each other, so as to connect various circuits for one or more second processors 2201 and one or more second memories 2202. In addition, as is known in the art, the bus architecture may be used to connect any other circuits, such as a circuit for a peripheral device, a circuit for a voltage stabilizer and a power management circuit. The second bus interface may be provided, and the second transceiver 2204 may consist of a plurality of elements, i.e., a transmitter and a receiver for communication with any other devices over a transmission medium. With respect to different UEs, the second user interface 2203 may also be provided for devices which are to be arranged inside or outside the UE, and these devices may include but not limited to a keypad, a display, a speaker, a microphone and a joystick. The second processor 2201 may take charge of managing the bus architecture as well as general processings. The second memory 2202 may store therein data for the operation of the second processor 2201.

In a possible embodiment of the present disclosure, the second processor 2201 is further configured to execute the computer program, so as to transmit one or more uplink power control parameters corresponding to each BWP to the UE.

In a possible embodiment of the present disclosure, the one or more target uplink power control parameters may include at least one of maximum transmission power, target received power, a power compensation factor, a path loss reference, a power adjustment value, and a TPC command word.

In a possible embodiment of the present disclosure, the second processor 2201 is further configured to execute the computer program, so as to: subsequent to receiving the uplink transmission on the first target BWP in accordance with the one or more target uplink power control parameters corresponding to the first target BWP, receive an actual power headroom corresponding to the first target BWP calculated in accordance with maximum transmission power corresponding to the first target BWP and actual transmission power of the PUSCH from the UE; or subsequent to receiving the uplink transmission on the first target BWP in accordance with the one or more target uplink power control parameters corresponding to the first target BWP, receive a virtual power headroom calculated in accordance with the maximum transmission power corresponding to the first target BWP and virtual transmission power of the PUSCH from the UE.

In a possible embodiment of the present disclosure, the second processor 2201 is further configured to execute the computer program, so as to transmit a BWP adjustment command indicating the first target BWP.

The network device 20 is capable of implementing the procedures of the above-mentioned network device with a same technical effect, which will thus not be particularly defined herein.

According to the network device 20 in the embodiments of the present disclosure, the uplink transmission on the first target BWP may be received in accordance with the one or more target uplink power control parameters corresponding to the first target BWP. As a result, it is able to control the transmission power with respect to the BWP, thereby to standardize the power control with respect to one or more BWPs.

Figure 23:
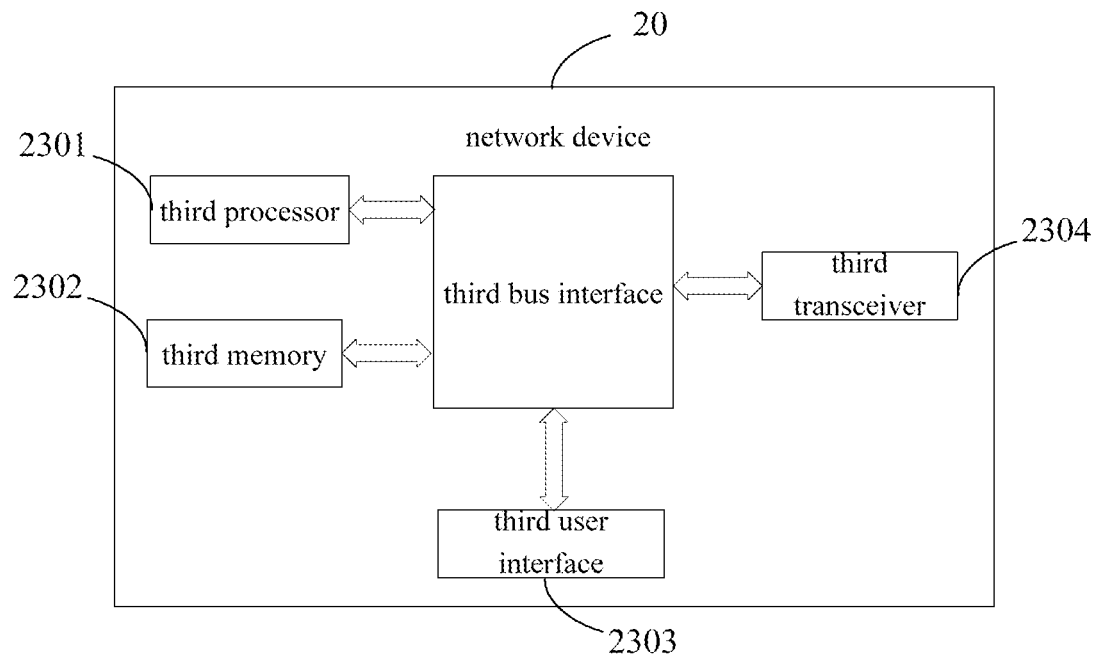
FIG. 23 is still yet another schematic view showing the network device according to some embodiments of the present disclosure.

The present disclosure further provides in some embodiments a network device 20 which, as shown in FIG. 23, includes a third processor 2301, a third memory 202, a third user interface 2303, a third transceiver 2304 and a third bus interface.

In the embodiments of the present disclosure, the network device 20 may further include a computer program stored in the third memory 2302 and executed by the third processor 2301. The third processor 2301 is configured to execute the computer program, so as to allocate transmission power with respect to downlink transmission on a second target BWP in accordance with one or more target downlink power adjustment parameters corresponding to the second target BWP.

In FIG. 23, bus architecture may include a number of buses and bridges connected to each other, so as to connect various circuits for one or more third processors 2301 and one or more third memories 2302. In addition, as is known in the art, the bus architecture may be used to connect any other circuits, such as a circuit for a peripheral device, a circuit for a voltage stabilizer and a power management circuit. The third bus interface may be provided, and the third transceiver 2304 may consist of a plurality of elements, i.e., a transmitter and a receiver for communication with any other devices over a transmission medium. With respect to different UEs, the third user interface 2303 may also be provided for devices which are to be arranged inside or outside the UE, and these devices may include but not limited to a keypad, a display, a speaker, a microphone and a joystick. The third processor 2301 may take charge of managing the bus architecture as well as general processings. The third memory 2302 may store therein data for the operation of the third processor 2301.

In a possible embodiment of the present disclosure, the third processor 2301 is further configured to execute the computer program, so as to transmit the one or more target downlink power adjustment parameters corresponding to the second target BWP to the UE.

In a possible embodiment of the present disclosure, the one or more target downlink power adjustment parameters may include at least one of EPRE of a synchronization signal, EPRE of a reference signal, and a ratio of the EPRE of the reference signal to EPRE of a downlink data signal.

In a possible embodiment of the present disclosure, the reference signal may be at least one of a DMRS, a CSI-RS, a TRS, and a PTRS.

The network device 20 is capable of implementing the procedures of the above-mentioned network device with a same technical effect, which will thus not be particularly defined herein.

According to the network device 20 in the embodiments of the present disclosure, the transmission power may be allocated with respect to the downlink transmission on the second target BWP in accordance with the one or more target downlink power adjustment parameters corresponding to the second target BWP. As a result, it is able to control the transmission power with respect to the BWP, thereby to standardize the power control with respect to one or more BWPs.

Figure 24:
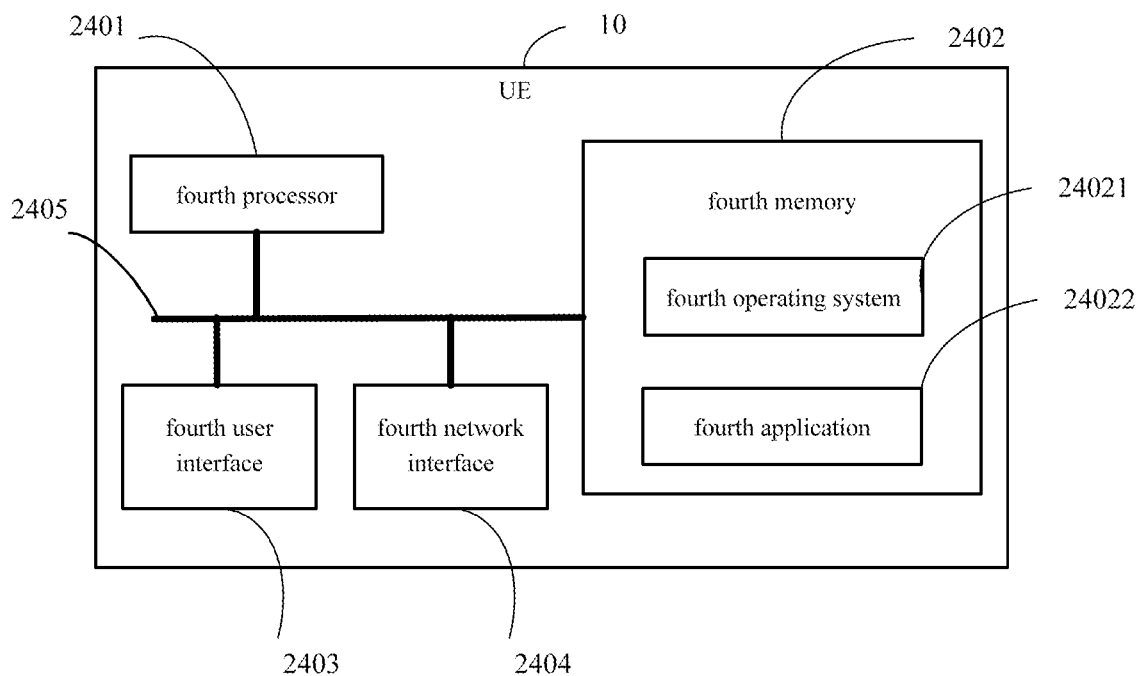
FIG. 24 is still yet another schematic view showing the UE according to some embodiments of the present disclosure.

The present disclosure further provides in some embodiments a UE 10 which, as shown in FIG. 24, includes at least one fourth processor 2401, a fourth memory 2402, at least one fourth network interface 2404 and a fourth user interface 2403. The components of the UE 10 may be coupled together through a fourth bus system 2405. It should be appreciated that, the fourth bus system 2405 is configured to achieve connection and communication among the components. Apart from a data bus, the fourth bus system 2405 may further include a power source bus, a control bus and a state signal bus. For clarification, all these buses in FIG. 24 may be collectively called as fourth bus system 2405.

The fourth user interface 2403 may include a display, a keyboard or a pointing device (e.g., mouse, track ball, touch plate or touch panel).

It should be appreciated that, the fourth memory 2402 may be a volatile memory, a nonvolatile memory or both. The nonvolatile memory may be an ROM, a PROM, an EPROM, an EEPROM or a flash memory. The volatile memory may be an RAM which serves as an external high-speed cache. Illustratively but non-restrictively, the RAM may include SRAM, DRAM, SDRAM, DDRSDRAM, ESDRAM, SLDRAM or DRRAM. The fourth memory 2402 intends to include, but not limited to, the above-mentioned and any other appropriate memories.

In a possible embodiment of the present disclosure, the following elements may be stored in the fourth memory 2402: an executable module or data structure, a subset or an extended set thereof, a fourth operating system 24021 and a fourth application 24022.

The fourth operating system 24021 may include various system programs, e.g., a framework layer, a core layer and a driving layer, so as to implement various basic services and process hardware-based tasks. The fourth application 24022 may include various applications, e.g., Media Player and Browser, so as to implement various application services. The programs for implementing the above-mentioned method may be included in the fourth application 24022.

In the embodiments of the present disclosure, the UE 10 may further include a computer program stored in the fourth memory 2402 and executed by the fourth processor 2401, e.g., a computer program in the fourth application memory 24022. The fourth processor 2401 is configured to execute the computer program so as to receive downlink transmission on a second target BWP in accordance with one or more target downlink power adjustment parameters corresponding to the second target BWP.

The above-mentioned method may be applied to, or implemented by, the fourth processor 2401. The fourth processor 2401 may be an IC having a signal processing capability. During the implementation, the steps of the above-mentioned method may be completed through an integrated logic circuit of hardware in the fourth processor 2401 or instructions in the form of software. The fourth processor 2401 may be a general-purpose processor, a digital signal processor, an ASIC, an FPGA or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the fourth memory 2402, and the fourth processor 2401 may read information stored in the fourth memory 2402 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a DSP, a DSPD, a PLD, an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the fourth memory and executed by the fourth processor. The fourth memory may be implemented inside or outside the fourth processor.

In a possible embodiment of the present disclosure, the fourth processor 2401 is further configured to execute the computer program, so as to receive the one or more target downlink power adjustment parameters corresponding to the second BWP from a network device.

In a possible embodiment of the present disclosure, the one or more target downlink power adjustment parameters may include at least one of EPRE of a synchronization signal, EPRE of a reference signal, and a ratio of the EPRE of the reference signal to EPRE of a downlink data signal.

In a possible embodiment of the present disclosure, the reference signal may be at least one of a DMRS, a CSI-RS, a TRS and a PTRS.

The UE 10 is capable of implementing the procedures of the above-mentioned UE with a same technical effect, which will thus not be particularly defined herein.

According to the UE 10 in the embodiments of the present disclosure, the downlink transmission on the second target BWP may be received in accordance with the one or more target downlink power adjustment parameters corresponding to the second target BWP. As a result, it is able to control the transmission power with respect to the BWP, thereby to standardize the power control with respect to one or more BWPs.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together. In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method, performed by a User Equipment (UE), the method comprising:
   receiving downlink transmission on a second target Bandwidth Part (BWP) in accordance with one or more target downlink power adjustment parameters among downlink power adjustment parameters configured by a network device, wherein the one or more target downlink power adjustment parameters correspond to the second target BWP,
   wherein the downlink power adjustment parameters are configured by the network device for respective BWPs separately, wherein each of BWPs is continuous physical resources in a frequency domain within a given carrier, and a number of the continuous physical resources contained in each BWP is less than a number of physical resources contained in the given carrier in the frequency domain.

2. The method according to claim 1, wherein prior to receiving the downlink transmission on the second target BWP in accordance with the one or more target downlink power adjustment parameters, the method further comprises:
   receiving the one or more target downlink power adjustment parameters corresponding to the second BWP from the network device.

3. The method according to claim 1, wherein the one or more target downlink power adjustment parameters further comprise at least one of: Energy Per Resource Element (EPRE) of a synchronization signal, EPRE of a second reference signal, or a ratio between EPRE of a first reference signal and EPRE of a downlink data signal.

4. The method according to claim 3, wherein the second reference signal is at least one of: a Demodulation Reference Signal (DMRS), a Channel State Information-Reference Signal (CSI-RS), a Tracking Reference Signal (TRS), or a Phase Tracking Reference Signal (PTRS).

5. The method according to claim 3, wherein the first reference signal is at least one of: a TRS, a PTRS, or a CSI-RS.

6. A method, performed by a network device, the method comprising:
   configuring downlink power adjustment parameters for respective target Bandwidth Parts (BWPs) separately, wherein each of BWPs is continuous physical resources in a frequency domain within a given carrier, and a number of the continuous physical resources contained in each BWP is less than a number of physical resources contained in the given carrier in the frequency domain; and
   allocating transmission power with respect to downlink transmission on a second target BWP in accordance with one or more target downlink power adjustment parameters among the configured downlink power adjustment parameters, wherein the one or more target downlink power adjustment parameters correspond to the second target BWP.

7. The method according to claim 6, wherein prior to allocating the transmission power with respect to downlink transmission on the second target BWP in accordance with the one or more target downlink power adjustment parameters, the method further comprises:
   transmitting the one or more target downlink power adjustment parameters corresponding to the second target BWP to a User Equipment (UE).

8. The method according to claim 6, wherein the one or more target downlink power adjustment parameters further comprise at least one of: Energy Per Resource Element (EPRE) of a synchronization signal, EPRE of a second reference signal, or a ratio between EPRE of a first reference signal and EPRE of a downlink data signal.

9. The method according to claim 8, wherein the second reference signal is at least one of: a Demodulation Reference Signal (DMRS), a Channel State Information-Reference Signal (CSI-RS), a Tracking Reference Signal (TRS), or a Phase Tracking Reference Signal (PTRS).

10. The method according to claim 8, wherein the first reference signal is at least one of: a TRS, a PTRS, or a CSI-RS.

* * * * *